…

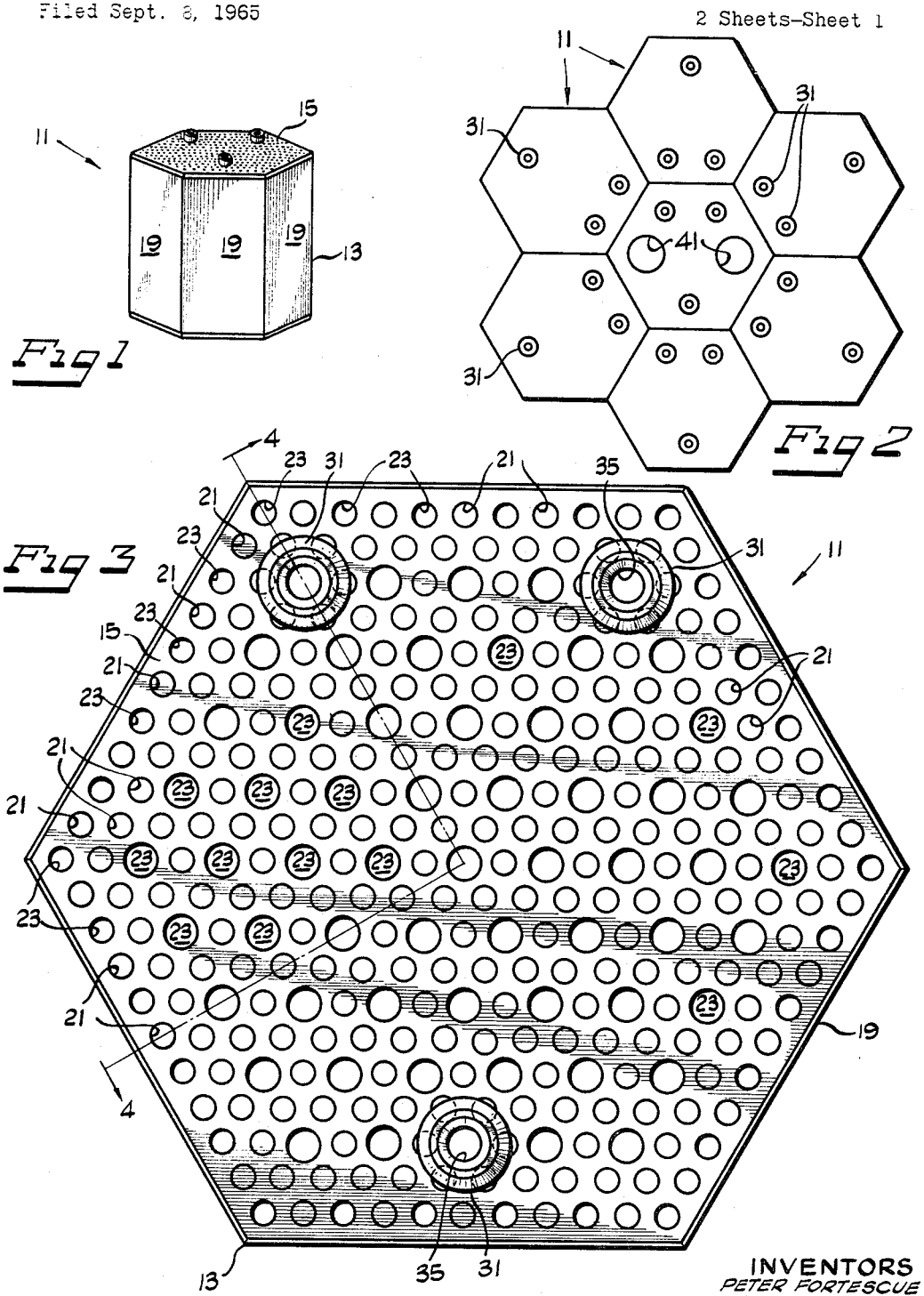

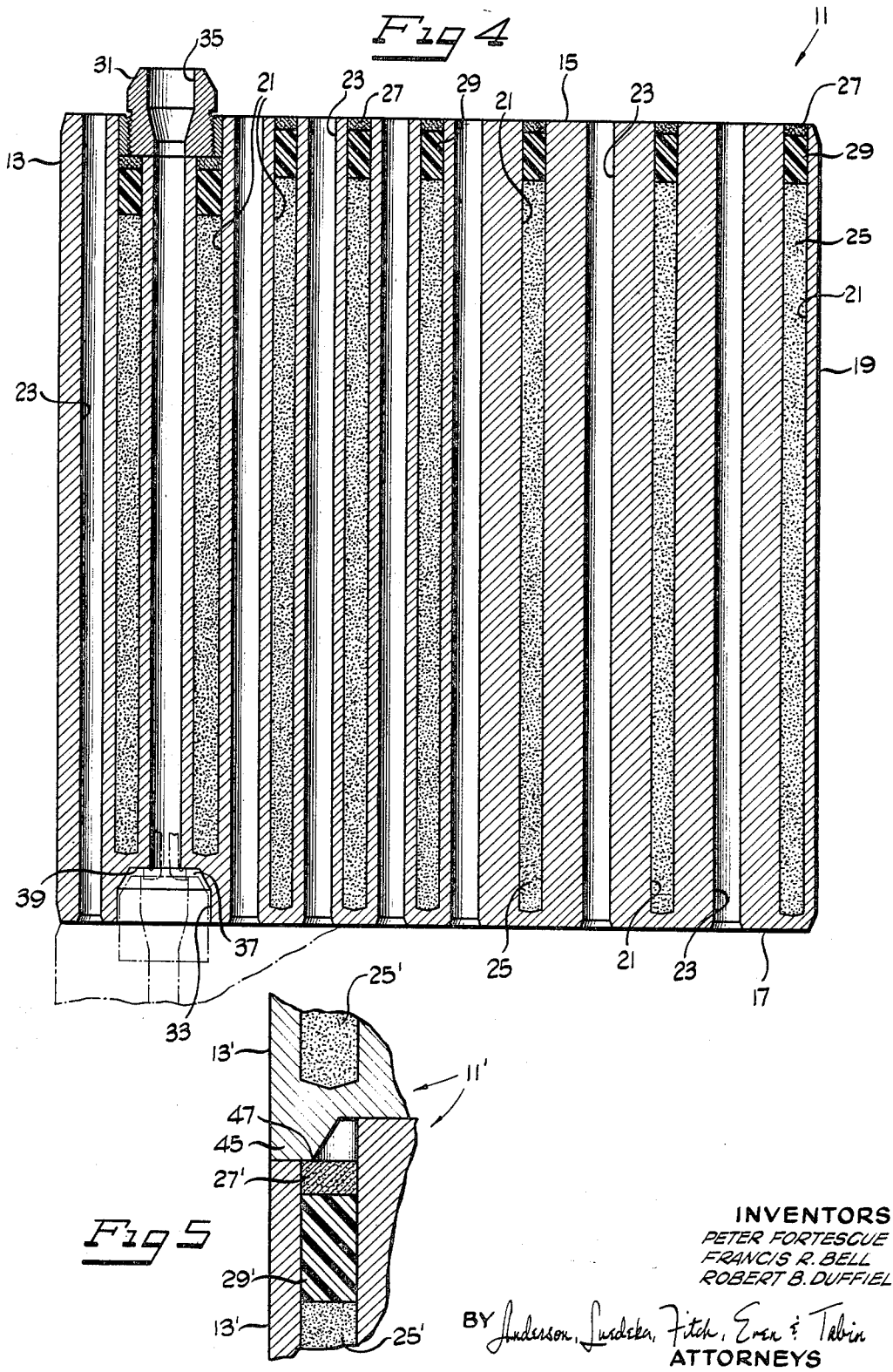

United States Patent Office 3,413,196
Patented Nov. 26, 1968

3,413,196
FUEL ELEMENT
Peter Fortescue, Rancho Santa Fe, and Francis R. Bell and Robert B. Duffield, San Diego, Calif., assignors, by mesne assignments, to the United States of America as represented by the United States Atomic Energy Commission
Filed Sept. 8, 1965, Ser. No. 485,811
7 Claims. (Cl. 176—73)

This invention relates to fuel elements for nuclear reactors and more particularly to fuel elements especially suited for use in high temperature gas-cooled nuclear reactors.

In reactors which operate at high power levels and which utilize a fluid coolant stream to extract heat from the fuel elements in the reactor core, it is important that efficient heat transfer from the nuclear fuel material in the fuel elements to the coolant stream be accomplished. It is also important that the temperatures throughout individual fuel elements be maintained at as constant a level as is practical so as to minimize thermal expansion gradients throughout a fuel element.

In reactors of this general type, which are often designed for the generation of useful power, it is important that operation of the reactor system be generally competitive with other competing systems for the generation of useful power. One significant factor in power cost is the expense of fuel element fabrication. Therefore, it is important that fuel elements be designed not only to effect efficient heat transfer between the nuclear fuel material and the fuel coolant stream but also to be capable of relatively inexpensive fabrication.

It is a principal object of the present invention to provide an improved fuel element for use in a nuclear reactor. It is a more particular object to provide a fuel element which exhibits a good heat transfer from the nuclear fuel material to the fuel coolant stream and yet is capable of being economically fabricated. It is another object of the invention to provide a fuel element especially suited for high temperature gas-cooled reactors which fuel element is simple in construction and has a good structural stability under operating conditions. Still another object is to provide a fuel element for use in a reactor core having a vertically flowing coolant stream which fuel element is adapted for disposition at different vertical levels in the reactor core. Yet another object is to provide a reactor core constructed of a plurality of fuel elements which are designed to facilitate orificing of the coolant stream to effect a greater flow of coolant through the portion of the reactor core which operates at the highest temperature. It is a further object to provide an improved reactor core made up of a plurality of fuel elements which are constructed so that individual fuel elements can be rearranged to facilitate a shift in the position of a fuel element both radially and axially relative to the center of the core during a refueling operation. These and other objects of the invention are more particularly set forth in the following detailed description and in the accompanying drawings wherein:

FIGURE 1 is a perspective view of a fuel element embodying various of the features of the invention;

FIGURE 2 is a diagrammatic plan view of a portion of a reactor core employing the fuel elements shown in FIGURE 1;

FIGURE 3 is an enlarged plan view of the fuel element shown in FIGURE 1;

FIGURE 4 is a sectional view taken along line 4—4 of FIGURE 3; and

FIGURE 5 is a enlarged fragmentary view, generally similar to FIG. 4, of an alternate fuel element embodiment.

It has been found that fuel elements can be advantageously made from solid blocks of refractory material, shaped with the height and the width of the blocks approximately equal. Fuel elements of this shape can be stacked side-by-side and one above another in vertical columns to create a reactor core. So that the fuel elements interfit with one another laterally and thus make most efficient use of the volume of the reactor core by providing a substantially continuous horizontal array, the blocks should have appropriate horizontal cross sectional shapes, as for example that of a regular polygon, such as a hexagon.

Each block serves as an individual fuel element and contains therein a plurality of fuel chambers and coolant holes arranged in a desired orientation so that the coolant flowing axially throught he coolant holes efficiently absorbs the heat generated in the nuclear fuel. The coolant holes extend completely through each block and are aligned with coolant holes in the other blocks so that, in a single vertical column of blocks, continuous vertical coolant passageways are provided which extend from the top to the bottom of the reactor core.

Now referring specifically to the drawing, a hexagonal fuel element 11 is shown which comprises a solid block 13 of refractory material having parallel flat top and bottom end faces 15 and 17, respectively, and having six vertical side faces 19 of equal dimensions which are perpendicular to the end faces. As can be seen, the height and the width of the block 13 are approximately equal, although other proportions may be employed.

The horizontal cross sectional shape of the block 13 is preferably that of a regular hexagon, although other suitable shapes may be employed. Other regular polygonal shapes, such as triangles or squares, may be used. Irregular shapes which so interfit with one another to provide a side-by-side horizontal array which is substantially continuous thereacross may be also employed. The illustrated regular hexagonal shape is preferred because adjacent blocks can be easily interfitted together with each side face adjacent a side face of an adjoining block (see FIG. 2) to minimize the space therebetween, through which space some flow of coolant will occur which may be undesirable for efficient reactor operation. Moreover, the assembled columns of hexagonal blocks 13 provide relatively good lateral support for one another. Generally the placement of adjoining columns of blocks is such that only sufficient space is allowed between the side faces 19 of blocks of adjacent columns to provide room to accommodate thermal expansion.

The blocks 13 may be made of any suitable refractory material that will retain good structural strength and dimensional stability at the contemplated operating temperatures of the nuclear reactor, that has relatively good thermal conductivity and that has good neutron moderating characteristics and a low neutron capture cross section. Preferably, dense graphite is employed. Unirradiated graphite having a coefficient of heat transfer of about 0.1 calorie per/cm./sec./° C. is considered acceptable.

As best seen in FIGURES 3 and 4, each hexagonal fuel element 11 includes a plurality of fuel chambers 21 and a plurality of coolant holes 23, with the coolant holes being of two sizes. The fuel chambers 21 are formed by drilling holes from the top end face 15 of the block 13 and extend downward to locations near the bottom of the block 13. The fuel holes are preferably drilled in directions parallel to the coolant holes 23. Each of the fuel chambers 21 is filled with suitable nuclear fuel material 25.

In the illustrated fuel element 11, no provision is made for purging fission products from the fuel chambers 21. Therefore, the nuclear fuel material 25 employed should have good retention of fission products. Although any suitable type of nuclear fuel material 25 may be employed, as for example fuel compacts or a fuel paste, preferably each of the fuel chambers 21 is filled with a packed bed of coated nuclear fuel particles. By utilizing a packed bed of nuclear fuel particles, the need for precise machining of the fuel chambers 21 in the fuel elements 11 in order to dimensionally match fuel chambers and the nuclear fuel material is reduced.

In general, any suitable fission product-retaining fuel particles may be employed which are compatible with the refractory material from which the block 13 is made. For use in a graphite block, nuclear fuel particles may be employed which are coated with pyrolytic carbon coatings that are fission product retentive. Obviously, other types of fission product retentive fuel particles may be employed which are compatible with a graphite block 13.

The nuclear fuel material 25 may contain fissile and/or fertile materials such as uranium, thorium, and plutonium, in either enriched or unenriched form, as dictated by the particular design and power generating characteristics of the nuclear reactor system.

Coated fuel particles of any suitable size may be employed; preferably, however, fuel particles having diameters (including the coating) in the range of about 250 microns to about 1000 microns are employed. The coatings should be capable of maintaining their integrity throughout the expected fuel element lifetime, usually a period of about seven years, and of excellently retaining the gaseous fission products therewithin. In general, the coatings should be sufficiently retentive that the release of fission product rare gases should not exceed about $10^{-5}$ of the total amount of rare gases generated over the fuel element lifetime.

Examples of suitable coating materials for a graphite-moderated fuel element system include, and are by no means limited to, pyrolytic carbon and silicon carbide. An example of one type of coated fuel particle considered suitable, which is sometimes hereinafter referred to as the triplex particle, is disclosed in detail in Patent No. 3,335,063 issued Aug. 8, 1967 in the names of Walter V. Goeddel, Charles S. Luby and Jack Chin, and assigned to General Dynamics Corporation. One example of a suitable coated fuel particle, generally as described in this co-pending application, is a particle having a nuclear fuel seed or center of a mixture of uranium dicarbide and thorium dicarbide, an inner coating spongy pyrolytic carbon about 5 to 50 microns, an intermediate coating of dense thermally conductive, laminar pyrolytic carbon between about 10 and 80 microns thick, and a distinct and discontinuous outer layer of dense thermally conductive columnar pyrolytic carbon about 10 to 80 microns.

In the construction of the fuel elements 11, after the necessary machining to create the fuel chambers 21 and the coolant holes 23 is completed, each of the fuel chambers 21 is filled with nuclear fuel material 25. The desired quantity of nuclear fuel material is filled into each chamber, employing vibration compaction or some other type of compaction, if desired, to achieve the desired amount of filling. Each of the fuel chambers 21 is closed at its upper end with a suitable plug 27 which fits generally flush with the top end surface 15 of the block 13. To allow for expansion of the nuclear fuel material 25 during reactor operation and to allow for shrinkage in the graphite block 13 as a result of neutron irradiation, a short space is left at the top of the packed bed of nuclear fuel material. In assembly, this space is preferably filled with a plug 29 of a heat-decomposable material, such as foamed polystyrene, which is carbonized and vaporized as the fuel element 11 is brought up to reactor temperature. Any suitable cement may be employed to fasten the closure plugs 27 in place, such as a mixture of coal tar pitch and graphite flour.

As can be seen from FIGURE 2, the fuel chambers 21 are preferably located in a triangular array, i.e. at the three corners of an equilateral triangle, although other lattice arrangements may be employed. With the fuel chambers 21 located in such a triangular array, the coolant holes 23 are likewise located in a triangular array (of lesser pitch) with a coolant hole 23 located generally in the center of each six fuel chambers 21. As can be seen in the central region of the block 13, there is one coolant hole 23 for each three fuel chambers 21. However, along the periphery of the block 13, the coolant holes 23 are smaller, having approximately the same diameter as the fuel chambers 21. In this peripheral region, each coolant hole only removes the heat from an average of two fuel chambers 21, instead of three. In the illustrated block 13, there are 240 fuel chambers, 61 large coolant holes and 30 smaller coolant holes.

In the illustrated block 13, the coolant holes 23 are on a constant triangular pitch, as are the fuel chambers 21. Accordingly, the centerlines of the coolant holes 23 and the fuel chambers 21 are in the same location in every fuel element 11. Likewise, the diameters of the coolant holes 23 in each block in a specific location have the same diameter. However, the diameters of the fuel chambers in different fuel elements 11 may vary. Such variations in fuel chamber diameter may be employed to accommodate greater loadings of nuclear fuel material in certain fuel elements 11. In various nuclear reactors, it may be desirable to employ different nuclear fuel loadings at different locations axially in the reactor core.

To facilitate alignment of the individual fuel elements 11 in a stacked column, the blocks 13 are provided with interengaging means at the top and bottom end faces thereof. In the illustrated fuel element 11, interengaging pins 31 and cavities 33 are employed. As can be seen, each of the fuel elements 11 includes three upstanding pins 31 which are set in the top faces 15 of the blocks 13. To register with the pins, three cavities 33 are provided in the bottom faces 17 of each of the blocks 13. Accordingly, when the fuel elements 11 are stacked one atop another, the three upstanding pins 31 at the top of each fuel element serve to precisely locate, and provide some lateral support for, the fuel element next above it. As can be seen in FIGURE 4, the fuel chambers 21 in the regions of the cavities 33, are slightly shortened to provide clearance for the cavities.

As best seen in FIGURE 3, the pins 31 are each aligned axially with a coolant hole 23. The pins 31 are generally tubular in shape so that hollow bores 35 of the pins serve to interconnect the coolant holes of adjacent blocks 13 into continuous vertical coolant passageways in a column of fuel elements 11. Moreover, the depth of each of the cavities 33 is slightly greater than the height that each pin 31 protrudes above the top end face 15 of the block 13, as can be seen in FIGURE 4 by the outline of a pin which is shown in phantom in the location wherein it would reside in a column of fuel elements 11. This disparity in dimensions provides a vacant space 37 between the horizontal upper end wall 39 of each cavity 33 and the upper end of each pin 31 in a column of stacked fuel elements 11. This arrangement affords ready handling of the fuel elements 11 via a suitable fuel element handling machine having three depending arms spaced apart and dimensioned so that the arms may be lowered into the three coolant holes 23 with which the pins 31 are aligned. When such a fuel handling machine has been lowered into position, fingers (shown in phantom) at the lower ends of the arms, which are then residing in the vacant spaces 37 can be extended radially so that, upon raising of the fuel element handling machine, these fingers engage the end walls 39 of the cavities 33 and lift the uppermost fuel element 11 in a column off the top thereof.

If, instead of employing such a three-armed fuel element handling machine, other handling arrangements are desired, the fuel element 11 can be easily adapted to accommodate them. For example, it may be desirable to employ a handling machine having only a single depending arm. In such a case the fuel element 11 may be best balanced by providing the point of engagement at its axial center. Accordingly, it may be desirable to counterbore the bottom end of the coolant hole 23 in the axial center of the fuel element to provide a ledge (not shown) which can be used to lift the fuel element 11. If it is felt that size and weight of the fuel element warrant it, a larger handling passageway may be desired, and the six fuel chambers 21 adjacent the center coolant hole 23 may be eliminated to provide the necessary space for such an enlarged handling passageway.

Instead of the illustrated three pin and cavity arrangement, other suitable interengaging arrangements may be employed. For example, one alternate arrangement is shown in FIG. 5, wherein prime numbers are used to designate components previously described. The fuel element 11' includes a depending peripheral skirt or lip 45 at the lower outer edge of each block 13'. A mating recessed groove 47 is correspondingly provided at the upper outer edge of each block 13'. One advantage of this arrangement is the reduction of possible coolant bypass flow which might leak radially outward from the vertical coolant passageways at the interfaces between adjacent stacked blocks 13'.

To accommodate control rods for the regulation of the power output of a nuclear reactor core, various of the fuel elements 11 are provided with control rod holes 41 which extend completely therethrough and thus provide a vertical channel in which a cylindrical control rod may be disposed. A fuel element 11 containing a pair of control rod holes 41 is shown in FIGURE 2. The total number of control rods employed, of course, depends upon the overall design of the reactor.

The control rod holes 41 are located in the blocks 13 in positions wherein they do not interfere with the pin and cavity arrangements and wherein they cause the least disruption of the scheme of the fuel chambers 21. As can be seen in FIGURE 2, the central block 13 in that group of fuel elements, which block contains a pair of control rod holes 41, has the holes located along a line extending between opposite corners of the hexagon.

The control rod holes 41 are slightly oversize with respect to the diameters of the control rods which are located therewithin so that no binding occurs between control rods and the inner walls of the holes. Because of the precise alignment of fuel elements 11 within a vertical column that is accomplished by means of the pin and cavity arrangement, control rod guide tubes need not be provided. The inner cylindrical surface walls of the control rod holes 41 are relied upon to guide the control rods in their travel upward and downward therewithin. The annular gap which results from the difference in size between the diameters of the control rod holes 41 and the diameters of the control rods provides vertical coolant passageways through which coolant flows during reactor operation. This coolant flow removes heat generated in the fuel chambers 21 adjacent to the control rod holes 41 and keeps the control rods cool.

A reactor core constructed from adjacent columns of hexagonal fuel elements 11 is considered to have several significant advantages over reactor cores constructed of a plurality of elongated cylindrical fuel elements in which the open space between fuel elements serves as a large passageway network through which the coolant stream may flow. A reactor core made up of such an arrangement of hexagon fuel elements 11 may be simply provided with differential coolant flow therethrough by means of orifices placed at the entry ends of the coolant passageways. In this manner, a greater amount of coolant may be allowed to flow through the central fuel elements 11 wherein the peak power is generated so that the outlet temperature of the coolant from these passageways approximates the average coolant outlet temperature throughout the entire reactor.

A reactor core made up of adjacent columns of disengageable fuel elements 11 also permits axial shifting or shuffling of fuel elements within a particular column or between different columns, during refueling operation of a portion of a reactor core. Such shuffling of fuel elements may be employed to obtain more uniform burnout of the nuclear fuel material in the individual fuel elements 11. It is recognized that the neutron flux at the fuel elements 11 near the top and bottom extremities of a vertical column will be of a lower level than the neutron flux at the fuel elements near the axial center of the column. Accordingly, it may well prove desirable to shuffle fuel elements between these locations so as to equalize the burnup of the nuclear fuel material in the different fuel elements 11. Moreover, such a reactor core arrangement also facilitates the interchange of fuel elements between columns which may be desirable to make adjustments according to the different ages of the fuel elements 11.

Furthermore, if desired, a core arrangement of this type facilitates the mixing of the upward flow of coolant from various of the coolant passageways of the different temperatures while the coolant gas is in the region of the upper reflector. If mixing is carried out at this point, the gas which enters the upper plenum chamber of a reactor, prior to its exit therefrom, is of a fairly average temperature so that hot spots are not a problem which should be compensated for in the upper plenum chamber.

The particular fuel element 11 illustrated has an arrangement of coolant holes 23 and fuel chambers 21 which efficiently removes heat from the fuel chambers and thereby hold the maximum temperature of the refractory material block 13 at a temperature lower than practically obtainable with other fuel element arrangements. This can be a considerable advantage when a material such as graphite is used for the blocks 13 for the effect of differential thermal expansion and contraction, coupled with contraction as a result of neutron irradiation, can set up substantial stresses within individual graphite blocks. Accordingly, the lower the maximum temperature of the graphite blocks can be maintained, the lower are the resulting stresses which need be accommodated.

The following example is illustrative of a nuclear reactor employing a reactor core constructed of fuel elements generally as shown in FIGURES 1 to 4. This example should be understood to in no way limit the scope of this invention which is defined in the appended claims.

Example

A plurality of hexagonal fuel elements 11 are fabricated from blocks of dense graphite, having a density of about 1.8 to 1.9 grams per cc. The height of each block 13 between the upper and lower end faces measures about 15.6 inches. The horizontal cross section through the block 13 is that of a regular hexagon measuring about 14.2 inches across the flats. Each of the fuel elements, other than those having control rod holes 41, contains 91 coolant holes and 240 fuel chambers. The larger coolant holes 23 have diameters of about 0.65 inch, and the smaller coolant holes have diameters of about 0.55 inch. There are 30 smaller coolant holes which are located in the peripheral row along the side edges of the hexagonal block 13 which peripheral row is one of alternating fuel chambers 21 and coolant holes 23. The coolant holes 23 are located in a triangular array with a triangular pitch of about 1.52 inches.

The diameters of the fuel chambers 21 vary slightly between the blocks 13 which are designed for location near the axial center of a column and those which are designed for location near the extremities thereof. In this respect, the diameters of the fuel chambers 21 vary from about 0.52 inch and about 0.30 inch. The distance between the outermost points of the peripheral coolant holes and fuel chambers and the side faces 19 of the block is about 0.25 inch. The fuel holes are drilled downward from the top end face 15 and extend to about one-quarter inch from the bottom of the block 13. Each of the control rod holes 41 has a diameter of about 3.25 inches and is designed to accommodate a control rod of a diameter of about 3.12 inches. The minimum web thickness of the graphite between adjacent fuel holes and coolant holes is about 0.17 inch.

A reactor core is constructed from these hexagonal fuel elements 11 using vertical columns of twelve fuel elements stacked one atop another to make-up the active core region. Additional graphite blocks of the same dimensions, but having only coolant and control rod holes therein with no fuel chambers, are added above and below the fuel elements 11 to provide a top reflector region and a bottom reflector region.

The reactor core is made from 247 columns of the construction just described, totaling 2,964 hexagonal fuel elements 11. Seventy-four control rods are employed, and the overall horizontal area of the active region of the reactor core (including the area of the control rod holes) measures about 300 square feet. The pitch between adjacent fuel elements 11 (when cool) is about 14.212 inches.

Each of the fuel chambers 21 is filled with a packed bed of spheroidal nuclear fuel particles having fission product retaining coatings. These spheroidal fuel particles have an average outer diameter of about 500 microns (including the coating). The particles comprise a solid solution of uranium dicarbide and thorium dicarbide with the thorium to uranium atom ratio being about 13 to 1. The center cores of these fuel particles measure about 300 microns, and a triplex pyrolytic carbon coating surrounds this center core. The innermost layer of spongy carbon measures about 30 microns. The intermediate layer of laminar pyrolytic carbon is about 35 microns thick, and the outer layer of columnar pyrolytic carbon is about 35 microns thick. The uranium employed has an enrichment of about 93 percent. The total reactor core employs about 1400 kg. of enriched uranium–235.

The nuclear reactor core is operated using helium as a coolant gas using the following parameters:

| Parameter: | Value |
| --- | --- |
| Total core flow rate | $3.694 \times 10^6$ lb./hr. |
| Fraction of coolant bypassing core (for side reflector and control rod cooling) | 8%. |
| Total core power | 843 Mt.(t.). |
| Core inlet temperature | 800° F. |
| Core outlet temperature (mixed mean) | 1427° F. |
| Core pressure drop | 5.5 p.s.i. maximum. |
| Radial peak/average power | 1.6. |
| Coolant pressure | 450 p.s.i.a. |
| Graphite thermal conductivity: | |
| Radial direction | 16.5 B.t.u./hr./ft./° F. |
| Axial and circumferential direction | 18.0 B.t.u./hr./ft./° F. |
| Maximum fuel bed temperature | 2420° F. |

The maximum fuel bed temperature of about 2420° F. compares very favorably with a helium-cooled reactor producing the same power but employing cylindrical graphite fuel elements having diameters of about 4.7 inches wherein the maximum fuel bed temperature measures about 100° F. higher. Moreover, the maximum graphite temperature in the hex block fuel elements (disregarding sporadic hot spots) measures about 2260° F. whereas, in the other comparable reactor, the maximum graphite temperature is again about 100° F. higher.

The reactor core constructed of the hexagonal fuel elements 11 is considered satisfactory for operation in a power reactor.

Various of the features of the invention are set forth in the following claims.

What is claimed is:

1. A nuclear reactor fuel element comprising a block of refractory material having relatively good thermal conductivity and neutron moderating characteristics which block has a pair of parallel flat end faces and a plurality of sides which are substantially perpendicular to said end faces, said sides being so arranged that the cross section of said block taken parallel to said end faces is a polygon of predetermined shape, said shape being such that a plurality of said blocks can be interfitted together side-by-side to provide a substantially continuous core array, said block containing a plurality of coolant holes which are arranged in a triangular array and which extend axially completely therethrough from end face to end face, said block also containing a plurality of integrally formed axially extending closed fuel chambers for holding nuclear fuel material, said fuel chambers being arranged in a triangular array of lesser pitch than the pitch of the coolant hole array so that a plurality of fuel chambers surround each coolant hole, said coolant holes being of larger diameter than said fuel chambers and each fuel chamber being equidistant from two coolant holes, and said block having at said end faces interengaging means for precisely axially aligning one of these fuel elements with another of these fuel elements disposed axially adjacent it, said means including a plurality of pins protruding from one end face thereof and mating cavities at the other end face thereof proportioned to receive said pins.

2. A nuclear reactor fuel element comprising a block of refractory material having relatively good thermal conductivity and neutron moderating characteristics which block has a pair of parallel flat end faces and a plurality of sides which are substantially perpendicular to said end faces, said sides being so arranged that the cross section of said block taken parallel to said end faces is a polygon of predetermined shape, said shape being such that a plurality of said blocks can be interfitted together side-by-side to provide a substantially continuous core array, said block containing a plurality of coolant holes which extend axially completely through said block from end face to end face, said block also containing a plurality of integrally formed axially extending closed fuel chambers for holding nuclear fuel material, and said block having at one end face thereof a plurality of hollow pins protruding from said end face, each of said pins being axially aligned with one of said coolant holes, said block having at the other end face thereof a plurality of mating cavities for receiving said pins, each of said cavities being aligned with one of said coolant holes, whereby when two of these fuel elements are engaged one axially adjacent another, said pins are received in said mating cavities and precisely axially align the two fuel elements while said hollow pins connect coolant holes in the two fuel elements in fluid communication.

3. A nuclear reactor fuel element comprising a block of refractory material having relatively good thermal conductivity and neutron moderating characteristics which block has a pair of parallel flat end faces and a plurality of flat sides which are substantially perpendicular to said end faces, said sides being so arranged that the cross section of said block taken parallel to said end faces is a regular polygon of a shape such that a plurality of said blocks can be interfitted together side-by-side to provide a substantially continuous core array, said block containing a plurality of coolant holes which extend axially completely through said block from end face to end face, said block also containing a plurality of integrally formed axially extending closed fuel chambers for holding nuclear fuel material, and said block having at one end face thereof a plurality of hollow pins protruding from said end face, each of said pins being axially aligned with one of said coolant holes, said block having at the other end face thereof a plurality of mating cavities for receiving said pins, each of said cavities being aligned with one of said coolant holes and being of a depth greater than the protruding height of said pins whereby when two of these fuel elements are arranged one axially adjacent another there is a vacant space provided between the ends of said pins and the end walls of said cavities in which vacant space fuel element handling means for moving said blocks can be accommodated.

4. A nuclear reactor fuel element comprising a block of dense graphite which block has a pair of parallel horizontal flat top and bottom end faces and six flat vertical sides, said sides being so arranged that the cross section of said block taken parallel to said end faces is a regular hexagon, said block containing a plurality of vertical coolant holes arranged in a triangular array which holes extend axially completely through said block from end face to end face, said block also containing a plurality of integrally formed closed vertical fuel chambers holding nuclear fuel material, which fuel chambers are disposed in a triangular array of lesser pitch than the pitch of said coolant holes, a plurality of upstanding hollow pins protruding from said top end face, each of said pins being axially aligned with one of said coolant holes, and said block having at said bottom end face thereof a plurality of mating cavities for receiving said pins, each of said cavities being aligned with the same coolant holes with which said pins are aligned and being of a depth greater than the protruding heights of said pins, whereby when two of these fuel elements are stacked one above another, said pins are received in said mating cavities, and whereby there is vacant space provided between the ends of said pins and the end walls of said cavities in which vacant space fuel element handling means for lifting said blocks by bearing upward against said cavity end walls can be accommodated.

5. A nuclear reactor core comprising a plurality of vertical columns of disengageable fuel elements stacked one atop another, said columns being arranged in side-by-side relationship to form a substantially continuous horizontal array, each of said fuel elements including a block of refractory material having relatively good thermal conductivity and neutron moderating characteristics, which block has a pair of parallel flat top and bottom end faces and a plurality of sides which are substantially perpendicular to said end faces, each of said blocks containing a plurality of vertical coolant holes which are arranged in a triangular array and which extend axially completely therethrough from end face to end face and which form continuous vertical coolant passageways in the reactor core, each of said blocks also containing a plurality of integrally formed vertically extending closed fuel chambers having nuclear fuel material disposed therein, said fuel chambers being arranged in a triangular array of lesser pitch than the pitch of the coolant hole array so that a plurality of fuel chambers surround each coolant hole, said coolant holes being of larger diameter than said fuel chambers and each fuel chamber being equidistant from two coolant holes, and said end faces of said blocks having mating interengaging means which precisely axially align said fuel elements in each of said vertical columns.

6. A nuclear reactor core comprising a plurality of vertical columns of disengageable fuel elements stacked one atop another, said columns being arranged in side-by-side relationship to form a substantially continuous horizontal array, each of said fuel elements including a block of refractory material having relatively good thermal conductivity and neutron moderating characteristics which block has a pair of parallel flat top and bottom end faces and a plurality of flat sides which are substantially perpendicular to said end faces, said sides being so arranged that the cross section of said blocks taken parallel to said end faces is a regular polygon, each of said blocks containing a plurality of vertical coolant holes which extend axially completely therethrough from end face to end face and which form continuous vertical coolant passageways in the reactor core, each of said blocks also containing a plurality of integrally formed vertically extending closed fuel chambers having nuclear fuel material disposed therein, and said end faces of said blocks having mating interengaging hollow pins and cavities which precisely axially align said fuel elements in each of said vertical columns, said hollow pins and cavities being aligned with coolant holes so that said hollow pins interconnect coolant holes in adjacent fuel elements.

7. A nuclear reactor core comprising a plurality of vertical columns of disengageable fuel elements stacked one atop another, said columns being arranged in side-by-side relationship to form a substantially continuous horizontal array, each of said fuel elements including a dense graphite block which block has a pair of parallel top and bottom flat end faces and six vertical sides which are substantially perpendicular to said end faces, said sides being so arranged that the cross section of said block taken parallel to said end faces is a regular hexagon, each of said blocks containing a plurality of vertical coolant holes which extend axially completely therethrough from end face to end face and which form continuous vertical coolant passageways in the reactor core, said holes being located in a triangular array, each of said blocks also containing a plurality of integrally formed closed vertical fuel chambers having nuclear fuel material disposed therein, said fuel chambers being located in a triangular array of lesser pitch than said holes, and a plurality of pins protruding upward from the top end faces of said blocks and being received in mating cavities disposed in the bottom end faces of the fuel elements next adjacent above, said pins being hollow and being aligned with coolant holes so that said hollow pins interconnect coolant holes in adjacent fuel elements.

References Cited
UNITED STATES PATENTS

| | | |
|---|---|---|
| 1,472,536 | 10/1923 | Thomson. |
| 1,809,508 | 6/1931 | Colby. |
| 2,998,364 | 8/1961 | Stubbs et al. _____ 176—84 |
| 3,005,765 | 10/1961 | Marshall _____ 176—58 X |
| 3,116,214 | 12/1963 | Greenstreet _____ 176—84 |
| 3,172,820 | 3/1965 | Lenngren et al. _____ 176—67 X |
| 3,238,106 | 3/1966 | Long et al. _____ 176—84 X |

BENJAMIN R. PADGETT, *Primary Examiner.*

M. J. SCOLNICK, *Assistant Examiner.*